C. L. HANNON & C. CROSS.
NUT AND BOLT LOCK.
APPLICATION FILED JUNE 6, 1916.
1,225,626.
Patented May 8, 1917.
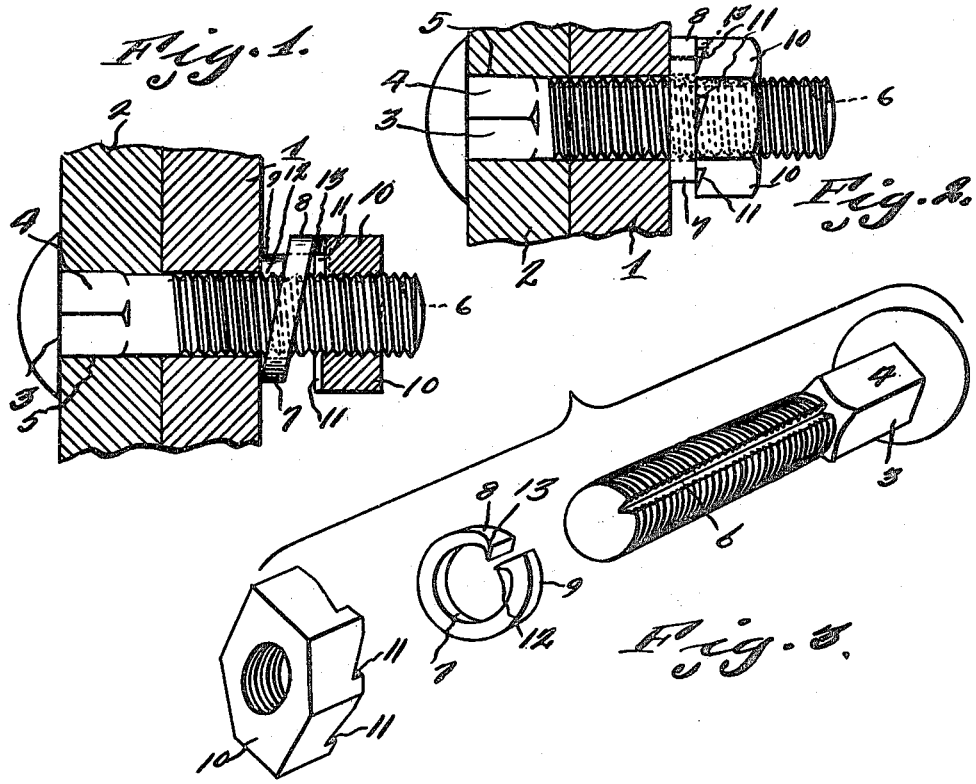
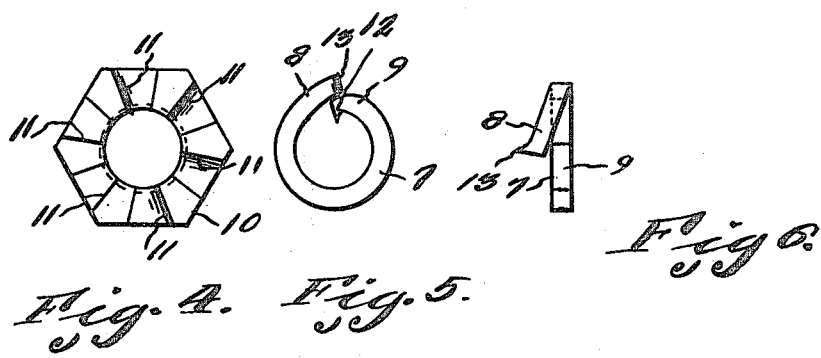
Witnesses
Inventors
C. L. Hannon
C. Cross
By
Their Attorneys

UNITED STATES PATENT OFFICE.

CUSTER L. HANNON AND CLAY CROSS, OF SKIATOOK, OKLAHOMA.

NUT AND BOLT LOCK.

1,225,626.  Specification of Letters Patent.  Patented May 8, 1917.

Application filed June 6, 1916. Serial No. 101,921.

*To all whom it may concern:*

Be it known that we, CUSTER L. HANNON and CLAY CROSS, citizens of the United States, residing at Skiatook, in the county of Tulsa, State of Oklahoma, have invented a new and useful Nut and Bolt Lock; and we do hereby declare the following to be a full, clear, and exact description of the invention, such as will enable others skilled in the art to which it appertains to make and use the same.

This invention relates to a new and useful nut and bolt lock, and an object of the invention is to provide a device of this kind, which is simple, efficient and practical in construction, and may be manufactured for a small cost, and applied very easily.

A further object of the invention is to provide a device of this kind comprising improved features of construction.

One of the features of the invention is the provision of a split yieldable ring having its ends offset normally, one end having means to engage a groove in the shank of the bolt, the other end to engage one of the teeth of one face of a nut, thereby locking the parts together, and preventing the nut from being removed.

In practical fields the details of construction may necessitate alterations falling within the scope of what is claimed.

The invention comprises further features and combination of parts as hereinafter set forth shown in the drawings and claimed.

In the drawings:—

Figure 1 is a sectional view, showing the nut and bolt lock as applied to a bolt, which passes through two members to be fastened together, showing the nut partly screwed home.

Fig. 2 is a view similar to Fig. 1, showing the nut screwed completely home.

Fig. 3 shows detail perspective views of the bolt, the split ring and the nut ready to be assembled.

Fig. 4 is a view in elevation showing one face of the nut.

Fig. 5 is a view in elevation of the split ring.

Fig. 6 is a view in edge elevation of the split ring.

Referring more especially to the drawings 1 and 2 designate two members to be clamped or bolted together, and 3 denotes the bolt, which is provided with a rectangular portion 4 on its shank, to engage a rectangular portion 5 of the opening in the member 2. The threaded portion of the shank is provided with an elongated groove 6 V-shaped in cross section. 7 designates a yieldable split ring. As shown in Figs. 1 and 6, it is to be seen that the end portion 8 of the ring is offset laterally from the end portion 9. The end portion 8 is also offset outwardly from the end portion 9, and moreover the annular or circular length of the ring is sufficient for the end portion 8 to overlap the end portion 9, when the ring is flattened out, as shown in Fig. 2, incident to the nut being screwed home. A nut 10 is threaded upon the shank, and its inner face is provided with a plurality of ratchet teeth 11. The end portion 9 of the ring is provided with a V-shaped lug 12, which extends toward the shank of the bolt, and engages the elongated groove 6, thereby preventing the ring 7 from turning. The face of the ring adjacent the ratchet face of the nut at the end portion 8 of said ring is provided with a V-shaped lug 13, so constructed, as to ratchet from one tooth 11 to another, and so on until the nut is screwed home, thereby substantially flattening the ring, as shown in Fig. 2. By this construction it is to be noted that the nut 10 is prevented from being removed and the bolt prevented from turning, thereby affording a simple, efficient, and practical nut and bolt lock.

It will be seen that the overlapping end portion 8 of the split ring 7 affords means for the easy release of the nut 10 when it is desired to remove it from the bolt 3. Any desired means may be used for insertion between the end 9 and the oval at the end 8 which means can be used as a pry for springing the overlapping end 8 beyond the radius of the nut, thus releasing it from engagement with teeth 11 and leaving the nut free to turn.

The invention having been set forth what is claimed as new and useful is:—

1. In a nut and bolt lock, the combination of a bolt passing through two members to be clamped and having means embedding in one of the members to prevent movement of the bolt and provided with an elongated groove in its shank and a nut threaded upon the shank and provided upon its inner face with a plurality of ratchet teeth, of a yieldable split ring interposed between the nut and the member to be clamped, one end of the ring having a lug extending toward the shank and shaped to fit the groove, the other end being offset laterally from the body of the ring and being of a length sufficient to overlie the other end when the nut is screwed home, said offset end of the ring having upon its face adjacent the ratchet face of the nut a V-shaped lug to ratchet over said teeth of the nut and finally engage one of said teeth when the nut is completely screwed home.

2. In a nut and bolt lock, the combination of a bolt passing through two members to be clamped and having means embedding in one of the members to prevent its turning therein and a nut threaded upon its shank, of a yieldable split ring surrounding the bolt and interposed between the nut and the member to be clamped, said bolt being provided with an elongated V-shaped groove formed longitudinally in its shank, said nut being provided with a plurality of ratchet teeth upon its inner face, one end of said ring having a lug so disposed and shaped as to fit the groove, the other end of the ring being offset laterally and circumferentially with respect to the first end and having a V-shaped lug to ratchet over said teeth of the nut, the offset end of the ring contacting with the teeth of the nut and having the V-shaped lug so disposed that one leg of the V is perpendicular to the face of the ring and being of a length sufficient to overlie the other end of the ring, so that when the nut is screwed home and the V-shaped lug has engaged a final tooth the offset end may be in a position to be prized out beyond the radius of the nut to permit the release of the same when it is desired to unscrew the nut.

In testimony whereof we have signed our names to this specification in the presence of two subscribing witnesses.

CUSTER L. HANNON.
CLAY CROSS.

Witnesses:
A. E. TOWNSEND,
C. H. CLEVELAND.

Copies of this patent may be obtained for five cents each, by addressing the "Commissioner of Patents. Washington, D. C."